(12) United States Patent
Drews et al.

(10) Patent No.: US 10,930,978 B2
(45) Date of Patent: Feb. 23, 2021

(54) MULTIFUNCTIONAL ION POUCH BATTERY CELL FRAME

(71) Applicant: FORD GLOBAL TECHNOLOGIES, LLC, Dearborn, MI (US)

(72) Inventors: Andrew Robert Drews, Ann Arbor, MI (US); Brian Joseph Robert, St. Clair Shores, MI (US); Mohan Karulkar, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 389 days.

(21) Appl. No.: 15/417,877

(22) Filed: Jan. 27, 2017

(65) Prior Publication Data

US 2018/0219261 A1 Aug. 2, 2018

(51) Int. Cl.

| | |
|---|---|
| *H01M 2/02* | (2006.01) |
| *H01M 10/0585* | (2010.01) |
| *H01M 10/647* | (2014.01) |
| *H01M 2/30* | (2006.01) |
| *H01M 10/6556* | (2014.01) |
| *H01M 2/10* | (2006.01) |
| *H01M 10/613* | (2014.01) |
| *H01M 10/6554* | (2014.01) |
| *H01M 2/12* | (2006.01) |
| *H01M 2/36* | (2006.01) |
| *H01M 10/0525* | (2010.01) |
| *H01M 10/48* | (2006.01) |

(52) U.S. Cl.
CPC ....... *H01M 10/0585* (2013.01); *H01M 2/021* (2013.01); *H01M 2/0275* (2013.01); *H01M 2/1061* (2013.01); *H01M 2/1223* (2013.01); *H01M 2/30* (2013.01); *H01M 2/361* (2013.01); *H01M 10/0525* (2013.01); *H01M 10/613* (2015.04); *H01M 10/647* (2015.04); *H01M 10/6554* (2015.04); *H01M 10/6556* (2015.04); *H01M 2/1077* (2013.01); *H01M 10/48* (2013.01); *H01M 10/486* (2013.01); *H01M 2220/30* (2013.01); *Y02T 10/70* (2013.01)

(58) Field of Classification Search
None
See application file for complete search history.

(56) References Cited

U.S. PATENT DOCUMENTS

| | | | |
|---|---|---|---|
| 6,143,440 A | 11/2000 | Volz et al. | |
| 6,296,967 B1 | 10/2001 | Jacobs et al. | |
| 6,743,546 B1 * | 6/2004 | Kaneda | H01M 2/021 |
| | | | 429/127 |
| 8,518,569 B2 | 8/2013 | Murphy et al. | |
| 9,023,503 B2 | 5/2015 | Seong et al. | |

(Continued)

FOREIGN PATENT DOCUMENTS

| | | |
|---|---|---|
| GB | 2537431 A | 10/2016 |
| WO | WO-2016083144 A1 * 6/2016 | ........ H01M 2/02037 |

*Primary Examiner* — Tracy M Dove
(74) *Attorney, Agent, or Firm* — David B. Kelley; Brooks Kushman P.C.

(57) ABSTRACT

A lithium ion pouch battery cell includes a rigid frame forming a skeleton of the cell and defining an aperture, an anode, a separator, and a cathode disposed within the aperture. The anode and cathode each include a current collector with an exposed tab portion, and a pair of terminals, integrated into the frame, each having an exterior portion and an interior portion bonded to one of the current collectors.

19 Claims, 5 Drawing Sheets

(56) References Cited

U.S. PATENT DOCUMENTS

| | | |
|---|---|---|
| 9,276,242 B2 | 3/2016 | Damon et al. |
| 9,379,365 B2 | 6/2016 | Schmieder et al. |
| 9,385,404 B2 | 7/2016 | Yoon et al. |
| 2006/0234119 A1 | 10/2006 | Kruger et al. |
| 2008/0171259 A1* | 7/2008 | Kanai .................. H01G 9/016 429/53 |
| 2011/0003185 A1* | 1/2011 | Kritzer .................. F16J 15/064 429/56 |
| 2012/0107663 A1 | 5/2012 | Burgers et al. |
| 2013/0095352 A1 | 4/2013 | Yamauchi et al. |
| 2013/0122336 A1 | 5/2013 | Park et al. |
| 2013/0157099 A1 | 6/2013 | Anderson |
| 2013/0280596 A1 | 10/2013 | Lee et al. |
| 2014/0103880 A1* | 4/2014 | Schaefer ............... H01M 2/021 320/134 |
| 2014/0147712 A1 | 5/2014 | Lee |
| 2014/0248515 A1* | 9/2014 | Wayne ................ H01M 10/647 429/82 |
| 2015/0037662 A1* | 2/2015 | Pinon .................. H01M 2/0237 429/179 |
| 2015/0171411 A1 | 6/2015 | Kobayashi et al. |
| 2015/0270516 A1 | 9/2015 | Mcleskey et al. |
| 2016/0036024 A1 | 2/2016 | Choi |
| 2016/0093857 A1 | 3/2016 | DeKeuster et al. |
| 2016/0204398 A1 | 7/2016 | Moon et al. |
| 2016/0248135 A1* | 8/2016 | Kim .................. H01M 10/625 |
| 2016/0254504 A1* | 9/2016 | Kim .................. H01M 2/1061 429/99 |
| 2016/0293926 A1 | 10/2016 | Yamada |
| 2017/0317324 A1* | 11/2017 | Westermeier ....... H01M 2/0237 |
| 2019/0067659 A1* | 2/2019 | Karulkar ............... H01M 2/021 |

\* cited by examiner

MULTIFUNCTIONAL ION POUCH BATTERY CELL FRAME

TECHNICAL FIELD

This disclosure relates to ion pouch battery cells, corresponding cell frames, and methods of producing the same.

BACKGROUND

Lithium ion pouch cells have been utilized in a variety of industries including automotive applications. The pouch cell designs are attractive due to their reduced weight and cost as well as optimized packaging efficiency at the battery level, higher specific density, and higher voltage output per cell than many other systems. Thus, lithium ion pouch cells have become the primary choice for many applications that require high specific and volumetric energy density such as automotive cells for electric vehicles and smart phones.

SUMMARY

In at least one embodiment, a lithium ion pouch battery cell is disclosed. The battery cell includes a rigid frame forming a skeleton of the cell and defining an aperture. The battery cell further includes an anode, a separator, and a cathode disposed within the aperture, the anode and cathode each including a current collector with an exposed tab portion. The battery cell also includes a pair of terminals, integrated into the frame, each having an exterior portion and an interior portion bonded to one of the current collectors. The cell may further include a flexible flat polymeric sheet arranged as the cell cover. The cover may envelope at least a portion of the frame. The pair of terminals may be molded within the frame. The frame may include a fluid channel running within at least one side of the frame. The exterior portion of each terminal may protrude outside of the frame. The frame may include a dual-purpose sealable aperture to release gas from the cell and to enable filling of the cell with an electrolyte. The battery cell may further include an interlocking feature, an alignment feature, an electronic communication device, or a combination thereof. The electronic communication device may include a temperature sensor, a strain sensor, a threshold value detector, a voltage or current detector, a sensor providing a signal to a conditioning device, or a combination thereof.

In another embodiment, a lithium ion pouch battery cell is disclosed. The battery cell includes a rigid frame including a fluid channel arranged along a periphery of the frame, the frame forming a skeleton of the cell and defining an aperture. The battery cell further includes an anode, a separator, and a cathode arranged within the aperture, the anode and cathode each including a current collector. The battery cell also includes a pair of terminals, integrated into the frame, each having an exterior portion and an interior portion bonded to one of the current collectors. The fluid channel may be enclosed within the frame. The fluid channel may be bifurcated. The fluid channel may include two branches. Each branch may be routed on a different side of the terminals. The fluid channel may run along one side of the terminals. The fluid channel may run through three sides of the frame. The battery cell may further include a dual-purpose sealable aperture, an interlocking feature, an alignment feature, an electronic communication device, or a combination thereof.

In a yet alternative embodiment, a stack of lithium ion battery cells is disclosed. The stack may include a first and second cell, each comprising a rigid frame forming a skeleton of each cell and defining an aperture containing an anode, a separator, and a cathode arranged within the aperture, the frame including a pair of integrated terminals connected to cell current collectors of the anode and cathode. The stack may also include the first and second cell each containing female and male interconnecting features capable of coupling the first cell to the second cell. The stack may also further include electronic communication devices on the first and second cells capable of sensing and communicating with each other, an external device, or both. The stack may include an alignment feature on the first and second cell, the alignment feature enabling stacking of the cells within an external structure.

In a yet alternative embodiment, a lithium ion pouch battery cell is disclosed. The cell may include a rigid frame forming a skeleton of the cell and defining an aperture. The cell may also include an anode, a separator, and a cathode disposed within the aperture. The cell may include a pair of terminals integrated into the frame. The frame may include an inward electrically non-conductive portion surrounding the aperture and an outward thermally conductive portion surrounding the inward portion such that the terminals are free from contact with the outward portion.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

With mass-production of batteries, a variety of battery formats have been developed. Example battery formats include cylindrical cells, button cells, prismatic cells, and pouch cells. The pouch cell design represents an efficient use of space and achieves about 90-95% packaging efficiency. Instead of using a metallic cylinder and glass-to-metal electrical feed-through, conductive foil tabs are typically welded to the electrodes and are fully sealed while extending outside of the pouch. By eliminating a metal enclosure, the weight of the pouch cell is reduced.

While a pouch cell is a lightweight solution to the battery design, the pouch format presents a number of considerations such as requirement for support and space to expand. Additional concerns are exposure to humidity and high temperatures which may shorten life of the cell. Swelling represents yet another concern, for example swelling by up to 8-10% over 500 cycles may be typical with some types of pouch cells. Yet, pouch cells have become popular, especially in the same performance criteria as cylindrical cells. Pouch cells have been successfully utilized in consumer, military, as well as automotive applications. Relatively large flat pouch cell packs have been applied in electric powertrains and Energy Storage Systems. Relatively small pouch cells have been used for portable applications with high load current requirements.

Lithium ion pouch cells thus represent a pouch made from a solvent- and gas-impermeable membrane in a clamshell construction. In its simplest version, two pieces of membrane are typically heat-sealed together on three sides to form a pocket for the cell contents, filled with electrolyte and sealed on the fourth edge to enclose the cell and electrolyte. In the initial sealing operation, electrical contacts to the cell are typically provided by using thin metallic terminals welded to the current collectors of the cell electrodes that protrude through the membrane sealing region, and the pouch material is heat-sealed around the terminals.

Figure 1A:
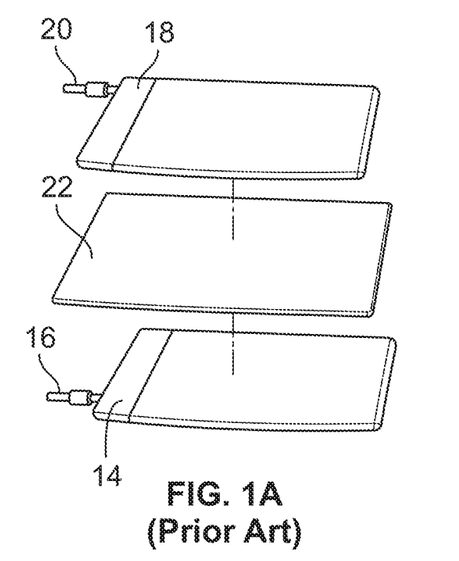
FIG. 1A depicts an exploded view of individual layers within a prior art pouch cell battery depicted in FIG. 1B.
Figure 1B:
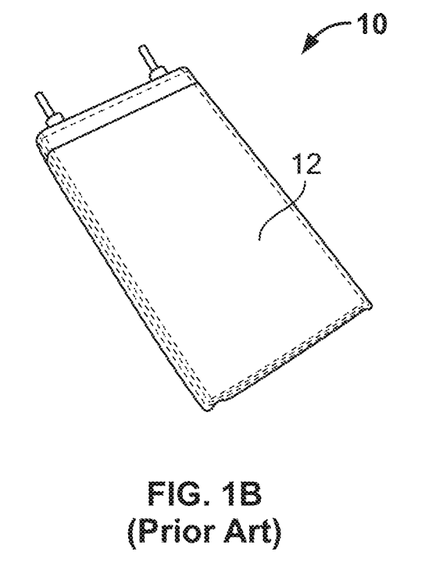
FIG. 1B depicts a perspective view of an example pouch cell battery.

An example prior art lithium-ion pouch cell 10 is depicted in FIGS. 1A and 1B. As can be seen in FIGS. 1A and 1B, a pouch cell 10 has a laminated architecture in a pouch 12. The pouch 12 includes a cathode 14 with a battery tab or terminal 16, an anode 18 with a battery tab or terminal 20, and a separator 22 sandwiched between the cathode 14 and the anode 18. After the laminated layers 14, 18, 22 are assembled together and inserted into the pouch 12, the pouch 12 is filled with electrolyte and subsequently sealed in such as a way that the tabs 16 and 20 are outside of the pouch 12.

To improve the robustness of the seals around the electrical terminals, a thin coating of hot-melt polymer is typically applied to the terminals in a separate, preliminary operation. During seam sealing, the pouch material is melted into the added sealing material. Although packaging in pouches is an inexpensive and easy method from a manufacturing perspective, this method for cell packaging suffers from several drawbacks.

Firstly, despite the use of a hot-melt coating on the terminals, it is difficult to achieve sufficient sealing around the terminals without suffering occasional leaks. This is primarily due to the need to melt the opposing pouch membranes and the terminal sealing material completely around the edges of the terminals to achieve a continuous seal. Sealing across any discontinuities introduces the possibility of incomplete "knitting" of the polymer from the two opposing membranes. While pre-coated tabs have been developed to address this problem, the method adds manufacturing operations and complexity as the pre-coated area of the terminals must be carefully positioned during the welding operation to ensure that the sealing surface is correctly aligned in the sealing region.

A second disadvantage of current pouch cell manufacturing processes is that the pouch must be "pre-formed" to produce a pocket to accommodate the thickness of the cell. This is needed to avoid significant distortion and wrinkling of a membrane when the cell is vacuum-sealed between the two membranes, which can lead to leaks. Pre-forming is accomplished by cold- or vacuum-forming a sheet of the pouch material over a form that mimics the shape of the cell contents. This process stretches the membrane and can lead to thin spots or breaks in the layers of the pouch material that are incorporated to limit gas permeation. As a result, significant cost is added to the pouch material to ensure lack of breaks in the permeation-limiting-layers during preforming. Yet, most of the pouch remains flat and is not deformed. Since there is no easy or inexpensive way to position a region of the gas permeation barrier, which is thicker to accommodate distortion during the preforming operation, the permeation-limiting-layers must be over-designed with respect to the needed performance for most of the area of the pouch.

An additional disadvantage lies in the fact that the sealed edges of a pouch cell offer little protection against mechanical damage to the vulnerable edges of the cell. Because the pouch material is necessarily thin, it has little mechanical strength and cannot offer significant resistance to edge-on impacts to the cell. In present methods of the lithium ion pouch assembly, the pouch cells are loaded into alignment slots, using their seams to align the cells. But the cell alignment guides must allow for easy insertion into the modules during assembly, and thus may not fully constrain the cells, leaving the cells vulnerable to abrasion and damage from vibration during vehicle use.

Additionally, the pouch cells may not generally include a dedicated gas vent which could release gasses formed by reactions between the electrolyte solvent and the active materials. Pouch cells are usually constrained between pressure plates to ensure that an increase of internal pressure caused by gas generation puts the greatest stress on the seams and creates slower gas release in a fault condition. Yet, experience from cell testing suggests that the gas release does not occur in a predictable manner at consistent pressures or locations.

Additionally still, flexible pouch materials generally have poor thermal conduction. In one common approach to thermal management, pouch cells are provided with metallic cooling plates between alternate pouch cells. But thermal conduction between the cell contents and the cooling plates is through an interface between the cell interior and the pouch material, through the pouch material itself, and then through a pouch material-cooling plate interface. It is typically found that thermal interfaces add significant thermal resistance to the conduction process, especially for dissimilar materials.

Lastly, pouch cells do not typically provide a suitable support structure to allow for robust incorporation of additional features such as sensors, feedthroughs, and/or electronic devices. The versatility to provide additional functionality to the cell as a unit is thus limited. Likewise, the pouch cell capability to interface with other devices is limited.

To overcome the problems mentioned above, a lithium ion pouch cell battery 100 is disclosed. In one or more embodiments, depicted, for example, in FIG. 2A, the pouch cell battery 100 includes a frame (not depicted) forming a skeleton of the cell 100. An example frame is depicted in FIGS. 3A-3E. The frame 126 defines an aperture 128. The aperture 128 is designed to accommodate the anode 118, the cathode 144, and the separator 112 located between the anode 118 and the cathode 114, as depicted in FIG. 2B. As FIG. 2A further illustrates, the pouch cell 100 includes a sheet arranged as the cell cover 140, enclosing the frame within the cell 100.

The frame 126, as illustrated in FIGS. 3A-3E, may be a rigid frame 126. The frame 126 may extend around the entire periphery of a pouch cell 100. The frame 126 may also extend only alongside a portion or a plurality of portions of the periphery of the pouch cell 100. The frame 126 may form a boundary between the inside and outside of a battery cell 100. The frame 126 may capture, hold, enclose and/or seal the anode, cathode, and separator within the aperture 128. The frame 126 thus provides protection from mechanical stresses to the anode, cathode, and separator which the cell 100 may be exposed to.

The frame 126 may be hollow or solid. The frame 126 may have a uniform or varying dimensions such as thickness. The frame 126 may be formed from any suitable electrically non-conducting material. The material should be substantially unreactive with the battery cell's electrolyte. The frame 126 may be made from one or more polymeric materials, ceramic, glass, or a combination thereof. The material may be a composite material. The material may be reinforced with fibers, glass, or other material. The polymeric material may be a non-polar polymer. The polymeric material may be thermoset or thermoplastic. The polymeric material may be a polyolefin such as polypropylene (PP), low-density or high-density polyethylene (LDPE, HDPE), polyimide (PI), the like, or a combination thereof.

The polymeric material may contain additives altering properties of the material. For example, the polymeric material may include one or more fillers, plasticizers, colorants improving thermal conductivity of the frame 126 and thus heat dissipation, maintaining relatively low electrical conductivity, increasing resistance to UV light, increasing mechanical strength, resistance to deformation at temperature extremes, the like, or a combination thereof.

Figure 3A:
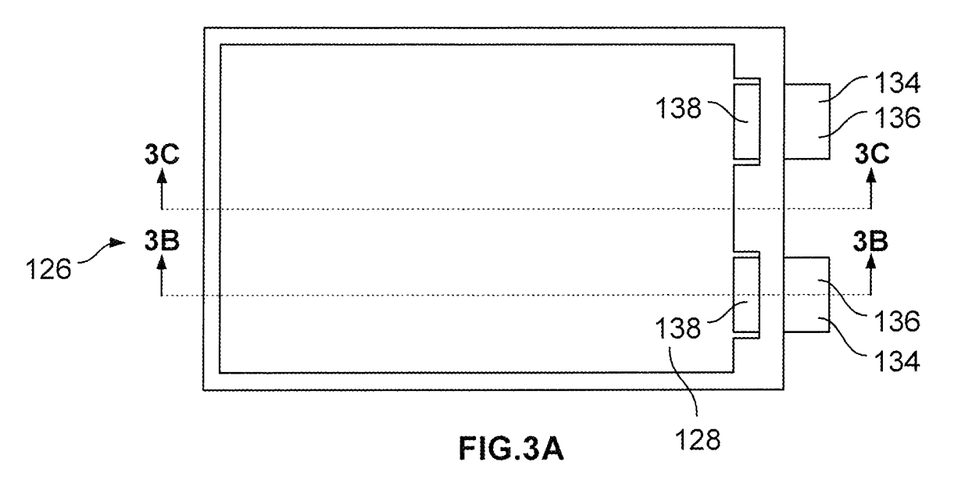
FIG. 3A depicts a top view of an example frame of the battery cell according to one or more embodiments.
Figure 3B:
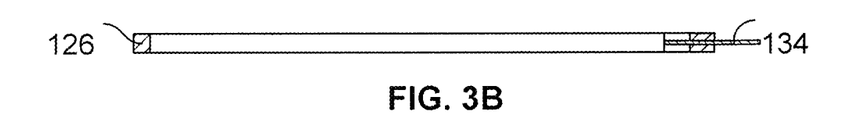
FIGS. 3B and 3C are cross-sectional views of the frame depicted in FIG. 3A along the lines 3B-3B and 3C-3C, respectively.
Figure 3C:
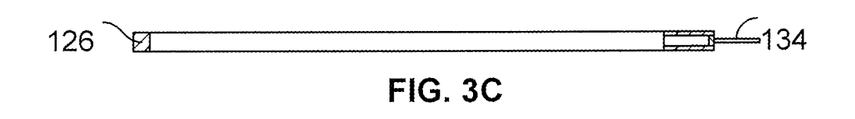
Figure 3D:
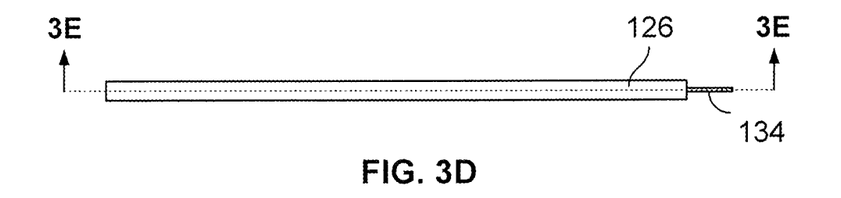
FIG. 3D illustrates a side view of the frame depicted in FIG. 3A.
Figure 3E:
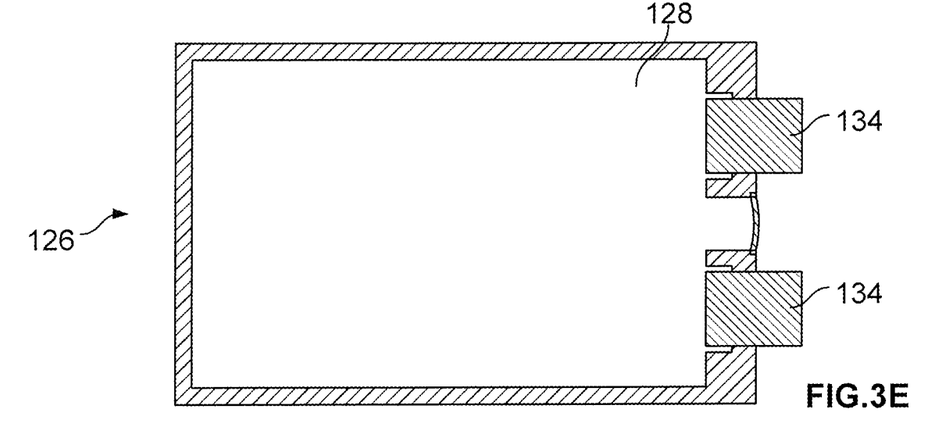
FIG. 3E shows a cross-sectional view of the frame depicted in FIG. 3D along the line 3E-3E.
Figure 3F:
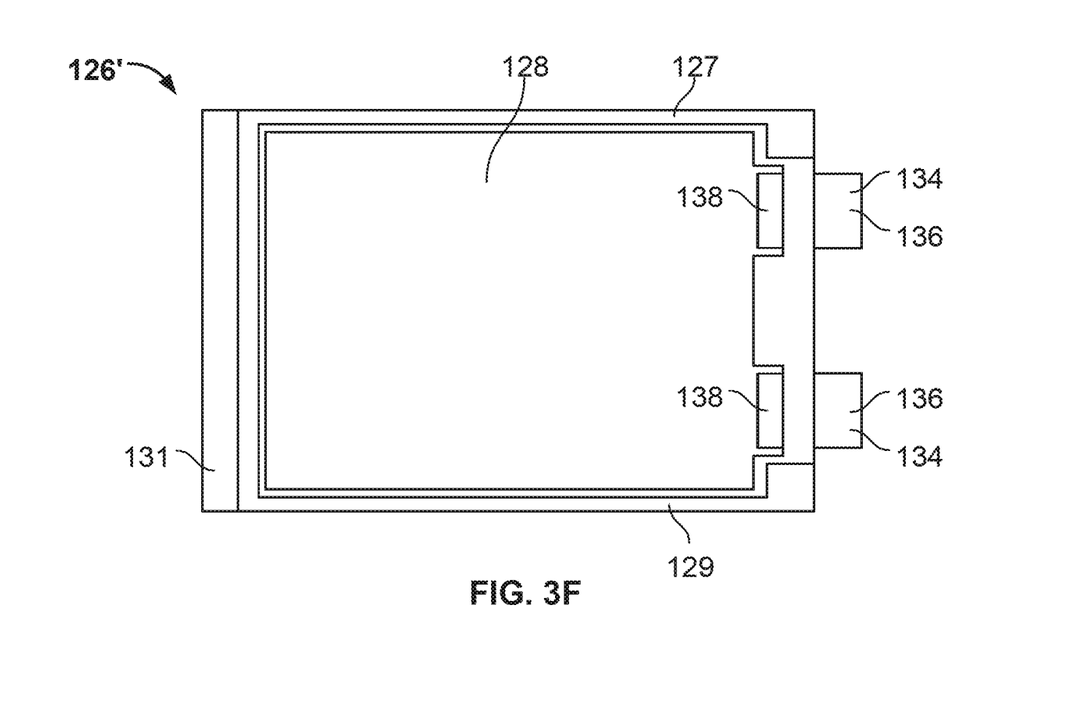
FIG. 3F shows a top view of an alternative example of the frame.

The entire frame 126 may be formed from one type of material. Alternatively, as is illustrated in FIG. 3F, at least a portion of the frame 126' may be made from a different material than the rest of the frame 126'. For example, the frame 126' may include an inward electrically non-conductive portion 127 surrounding the aperture 128, and an outward thermally-conductive portion 129 surrounding the inward portion 127. In such an embodiment, the terminals 134 are free from contact with the outward portion 129. The conductive portion 129 may be in contact with an external heat exchanger 131. Such embodiment provides enhanced thermal transfer due to presence of the conductive material. Yet, at the same time, the terminals 134 are insulated from the conductive portion 129 of the frame 126'. The electrically non-conductive portion 127 may be made from one or more materials identified above such as various plastics. The conductive portion 129 may be made from one or more metals such as aluminum, copper, magnesium, nickel, zinc, the like, or a non-metal material having a desirable thermal conductivity, or a combination thereof.

Figure 2A:
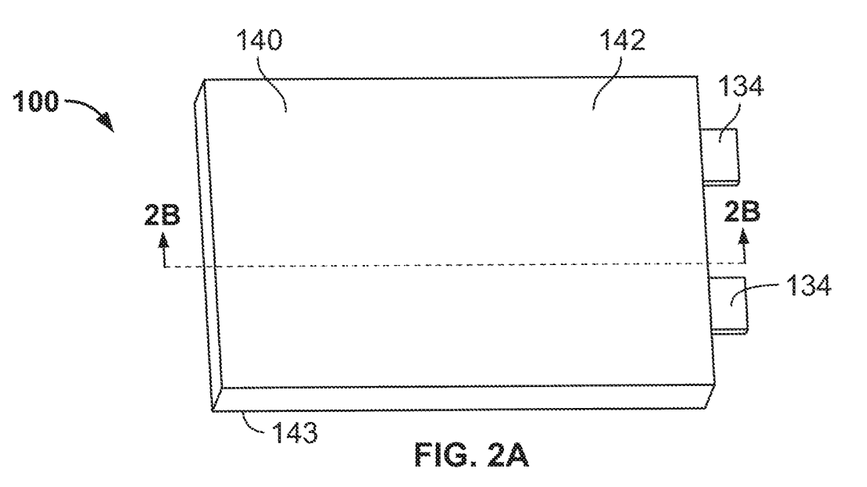
FIG. 2A depicts a perspective view of an example battery cell according to one or more embodiments.
Figure 2B:
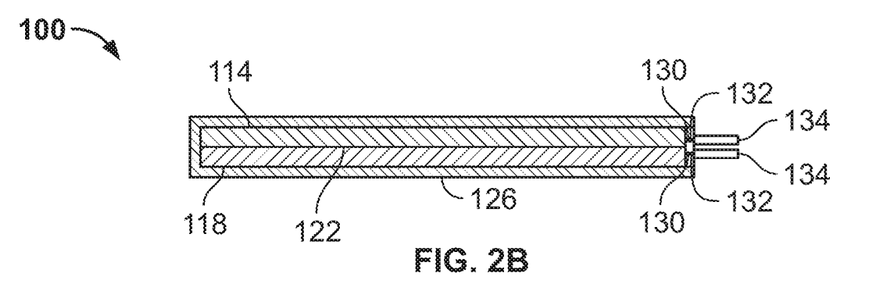
FIG. 2B shows a cross-sectional view of the battery cell depicted in FIG. 2A along the line 2B-2B.

The frame 126 may be covered by the cell cover 140, an example of which is depicted in FIG. 2A. The cell cover 140 may thus hold the cathode, the anode, the separator, the electrolyte, and the frame 126. The cell cover 140 may be arranged around the frame 126 in a tight or loose manner. The entire frame 126 or a portion of the frame 126 may be covered with the cell cover 140. The cell cover 140 thus envelops at least a portion of the frame 126.

The cell cover 140 may be flexible. The cell cover 140 may be semi-rigid. The cell cover 140 may be rigid. The cell cover 140 may be more flexible than the frame 126. While the periphery of the cell 100 is rigid due to the inclusion of the frame 126 within the cell cover 140, the faces of the cell, or the top portion 142 and the bottom portion 143, may remain flexible due to absence of a rigid structure within the aperture 128. The cell cover 140 may be flat such that the cell cover 140 lays flat against the frame structure 126. Alternatively, the cell cover 140 may include at least one raised portion. The cell cover 140 may be adhered to the frame 126 to complete the enclosure for the cell 100.

The cell cover 140 may be made from a polymeric material. The cell cover 140 may be a flexible sheet. The cell cover 140 may be made from a thermoplastic film. The cell cover 140 may be made from polyethylene (PE), polyester, imide, ketone, fluoropolymer, sulfone-based polymer, a resin, or a combination thereof. The cell cover 140 may be made from a bioplastic, and/or a biodegradable material. The cell cover 140 may be a monolayer or alternatively include a plurality of layers. The sheet may be laminated and include a metal foil as an intermediate layer sandwiched between polymeric materials. The cell cover 140 may be a co-extruded film. The thickness of the cell cover 140 may be from about 80 to 200 µm, 100 to 180 µm, 120 to 150 µm.

A variety of features may be incorporated into the frame 126 structure. For example, as can be seen in FIGS. 3A-3F, a pair of terminals 134 may be integrated into the frame 126. Each terminal 134 may have an exterior portion 136 and an interior portion 138. The interior portion 138 may be bonded to a current collector 130, depicted in FIG. 2B, of an anode 118 or cathode 114 and/or to an exposed tab portion 132 of the current collector 130. The exterior portion 136 may protrude outside of the frame 126. Alternatively, the exterior portion 136 may be flush with the periphery of the frame 126.

The pair of terminals 134 may be molded into the frame 126 structure. Alternatively, the frame 126 may be formed without the terminals 134 which may be inserted within the frame 126 later. Yet, it is advantageous to form the pair of terminals 134 as an integral portion the frame 126 such that there is a hermetic seal between the terminals 134 and the frame structure 126. The terminals 134 are electrical current carrying tabs. The terminals 134 provide electrical communication between the cell interior and the cell exterior.

The terminals 134 integrated into the frame 126 and the current collectors 130 of the electrodes are made from metal. Both terminals 134 may be made from the same or different metal. The terminal 134 may be made from the same metal as the current collector 130 the terminal is attached to. For example, the metal may be copper, aluminum, etc.

Figure 4A:
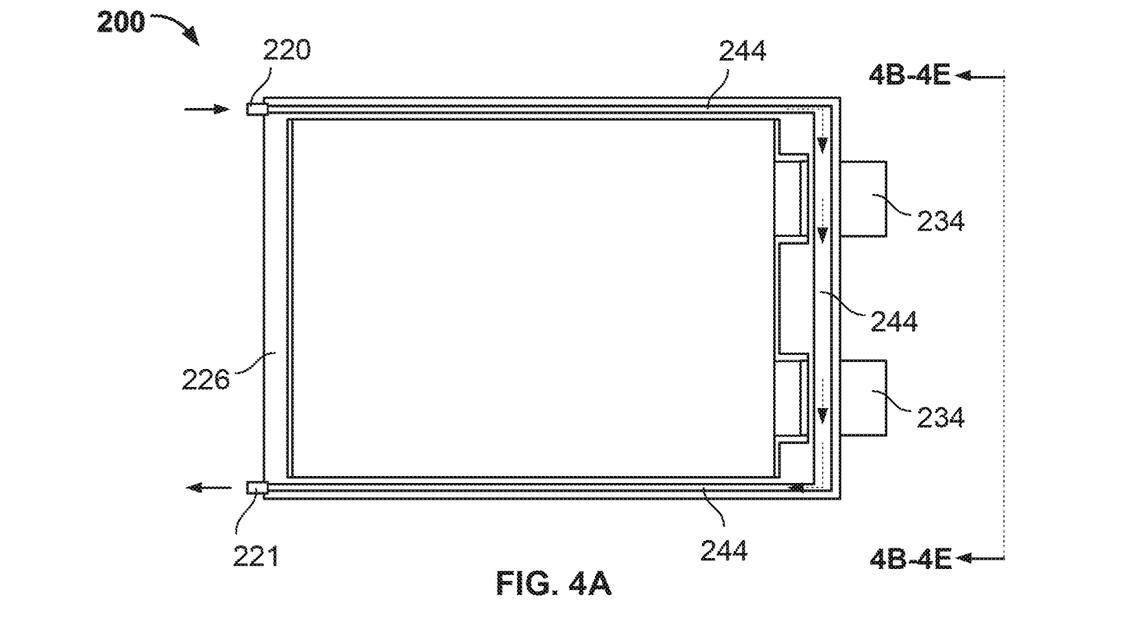
FIG. 4A shows a top view of an alternative example of the frame with channel portions.
Figure 4B:
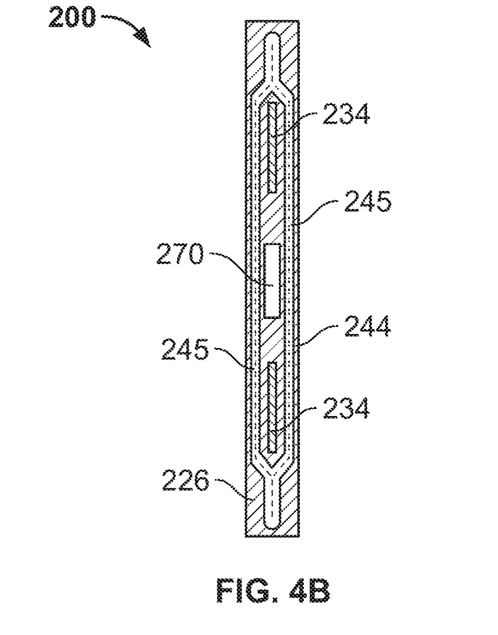
FIGS. 4B-4E show cross-sectional views of different examples of routing of a channel portion of the frame depicted in FIG. 4A along the line 4B-4E.
Figure 4C:
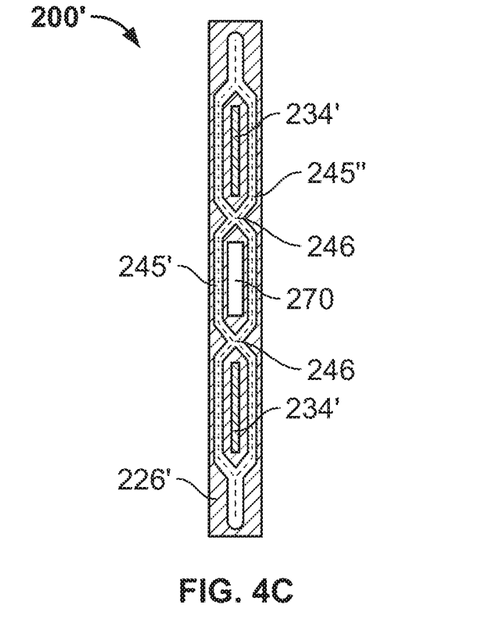
Figure 4D:
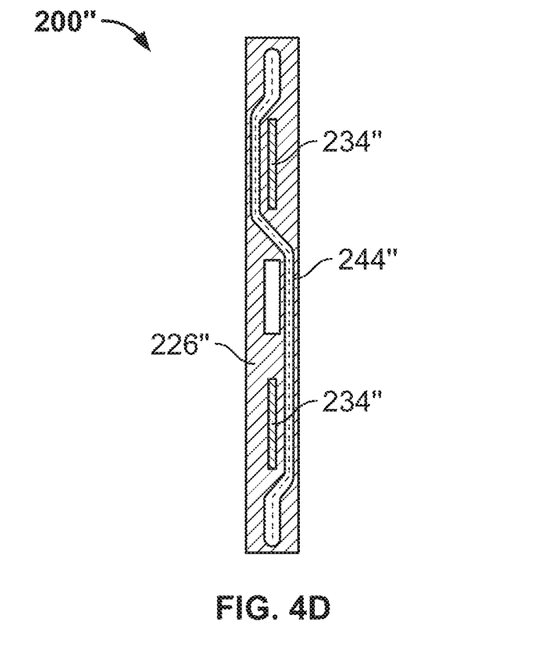
Figure 4E:
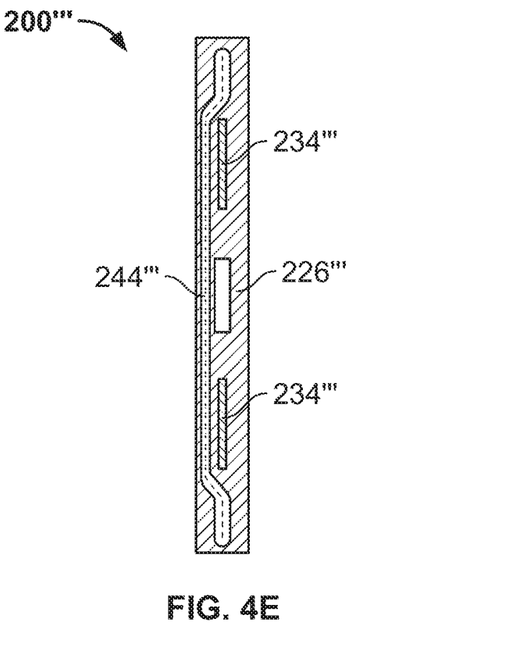

Among other features which may be incorporated into the frame are one or more channels. In an embodiment depicted in FIGS. 4A-4E, the frame 226 of the cell 200 may be produced in such a way that one or more internal passages 244 run through the frame 226. The passages or channels 244 may be included on one or more sides of the frame 226. All sides of the frame may include the channels 244. The channels 244 may be arranged along a periphery of the frame 226. The channels 244 may have uniform or varying dimensions. The channels 244 may be bifurcated, as is depicted in FIGS. 4B and 4C. The bifurcated channel 244 has two branches 245, each branch 245 running alongside different side of the terminals 234. The branches 245 may be routed in a variety of ways. For example, in an embodiment depicted in FIG. 4C, one branch 245' may run on the left side of the terminals 234' and connect with a second branch 245' running on the right side of the terminals 234' in at least two points of contact 246. Alternatively still, in an embodiment shown in FIG. 4D, a channel 244" may be routed along one side of the first terminal 234" and then along the opposite, second side of the second terminal 234". Yet, in at least one additional embodiment, depicted in FIG. 4E, the entire length of the channel 244" may run alongside the same side of the terminals 234".

The channel 244 may be enclosed within the frame 226. The channel 244 may have one or more portions 244. At least one of the channel portions 244 may be in contact with the exterior of the cell through an inlet 220 or outlet 221. For example, in FIG. 4A, one of the three depicted channel portions 244 is in contact with a fluid entering the channels 244, the fluid originating outside of the cell 200. The arrows indicate the direction of the fluid moving within the channel portions 244. The fluid may be any fluid causing a desirable change in temperature within the cell 200 or a stack of cells. The fluid may be a coolant such as air, oxygen, water, or another liquid coolant. Alternatively, the fluid may provide heat to the cell 100. Alternatively still, the channel portions 244 may serve for both heating and cooling.

Figure 5:
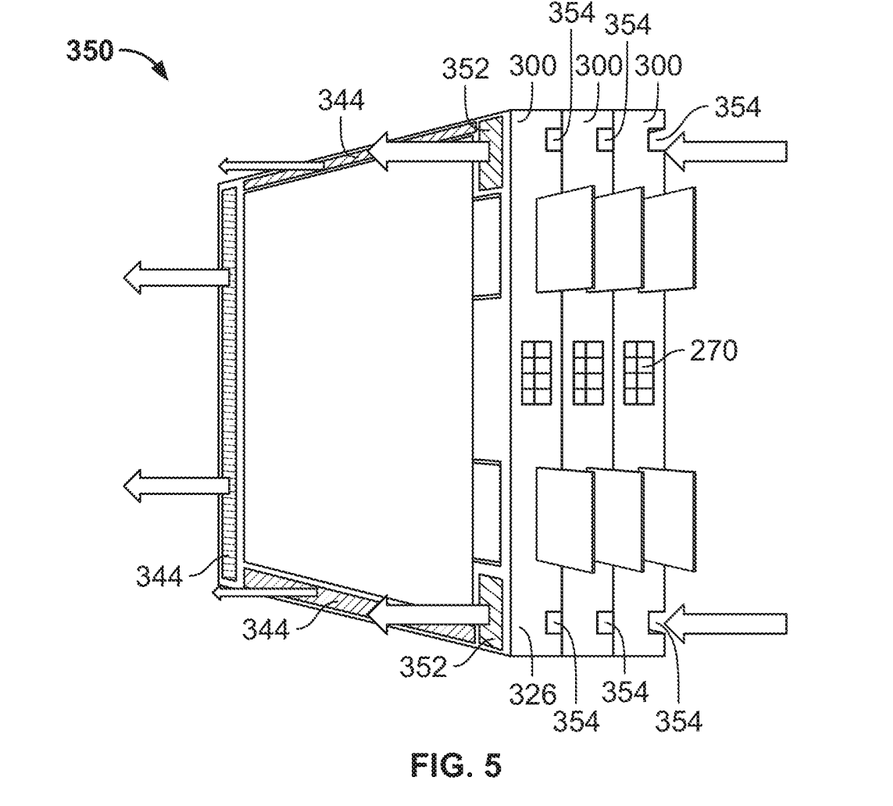
FIG. 5 shows a perspective view of a battery cell stack.

The one or more channels may provide fluid flow contained within the frame structure of one cell. Alternatively, as is depicted in FIG. 5, the one or more channels may provide fluid flow between adjacent frames, external cooling devices, the like, or a combination thereof. In FIG. 5, three adjacent cells 300 are aligned and interlocked next to each other to form a single unit or a battery pack 350. Each frame 326 includes one or more channel portions 344 integrated within a single frame 326. In addition, common fluid channels 352 run through the adjacent cells 300. The common channels 352 may be multiple. Alternatively, a single common channel 352 may be present in the batter pack 350. At least one of the common channel 352 may be in contact with at least one of the channel portions 344 of at least one of the cells 300.

An additional feature incorporated within the frame may be one or more openings 270, an example of which is depicted in FIGS. 4B-4E and also in FIG. 5. The opening 270 may serve as a vent for release of gas pressure accumulated within the cell. The vent may be configured for one-time action in the event of a dangerous build-up of gas pressure in the cell. Alternatively, an opening 270 may serve as a fill port for supplying electrolyte into the cell. The opening 270 may be sealable. The seal may be permanent or temporary. The opening 270 may serve more than one function or purpose. For example, the opening may serve as the vent and a fill port. In such an embodiment, the opening 270 may allow for electrolyte filling of the cell after which the same opening 270 may be provided with a gas release port. The gas release port may include a gas release mechanism such as a burst disk. The opening 270 may include one or more membranes arranged as the seal. The membrane may be a metallic or polymeric film.

In one or more embodiments, a plurality of cells may be connected to form a battery cell pack. The cell pack may include one to several hundred cells. Example battery cell pack 350 is depicted in FIG. 5. In FIG. 5, the frame 326 may include features 354 that allow adjacent cells 300 within the battery pack 350 to interconnect and thus form a single unit. The features 354 may be interlocking and/or alignment features. The alignment features ensure proper alignment of the individual cells 300 and their features such as the common channel 352 or channel portions 344, and/or ensure proper alignment of the cells 300 within a structure external to the cells 300. The alignment features may provide for interlocking of the cells 300 in the battery pack 350. Alternatively, in cases where the alignment features allow for more precise integration of the cells 300 into an external structure, the features 354 may also enable interfacing of the features, either between the cells 300 or with external structures. The same feature 354 may ensure alignment as well as provide interlocking. The features 354 may include male and female counterparts capable of coupling one frame 326 to another frame 326. The features 354 may include screws, bolts, locking clips, tabs, notches, grooves, protrusions, or projections. At least a first feature 354 may form a portion of one side of the first frame while a counterpart second feature 354 fitting in or connecting with the first feature 354 may be located on one side of the second frame facing the one side of the first frame.

The external structures mentioned above may be electronic communication and/or sensing devices, a temperature sensor, a strain sensor, a threshold value detector, a voltage detector, a current detector, a sensor providing a signal to a conditioning device, a logical computing device, communication devices or passages to house any of the sensors, feedthroughs or electronic devices, the like, or a combination thereof.

Figure 6:
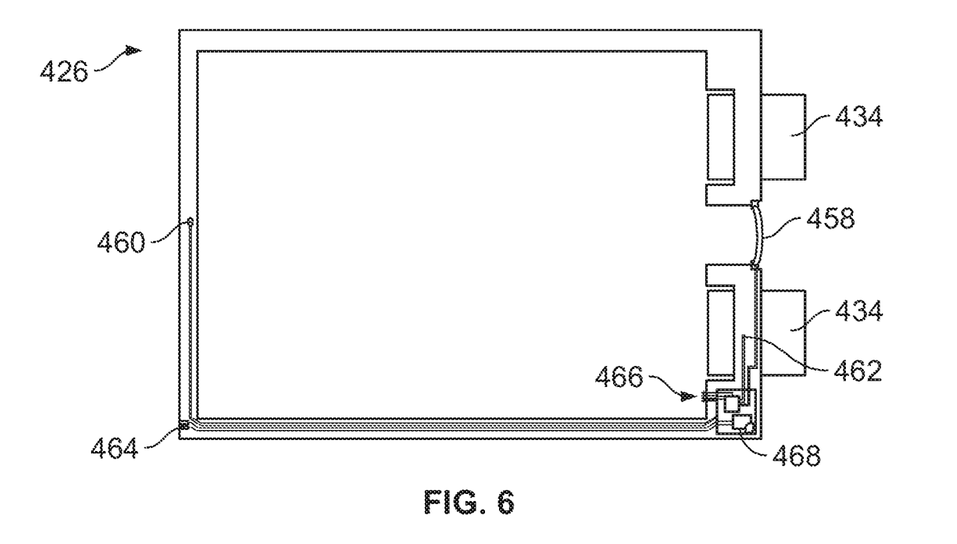
FIG. 6 illustrates a top view of an alternative embodiment of a frame with example electronic devices incorporated within the frame.

In one or more embodiments, one or more electronic devices may be incorporated into the frame structure. The electronic devices may enable sensing and/or communication with external devices such as Battery Electric Control Module (BECM) to report on the state of health of the cell. An example frame 426 with built-in electronic communication devices is depicted in FIG. 6. The frame 426 features a vent sensor 458, an embedded sensor 460, a temperature sensor 462, an external device interface 464, an internal sensor feedthrough 466, and a signal conditioning and communication circuit 468. Other devices such as a voltage sensor or a detector such as voltage, current, temperature, strain, damage threshold detector may be included. The feedthrough devices may provide a connection to sensor internal to the cell.

Sensors that require signal conditioning may provide signals to a conditioning device, such as an amplifier, a microcontroller, or a Field-Programmable Gate Array (FPGA). In some embodiments, signals from each cell may be transmitted to an external monitor system through wired connections, through fiber-optic connection, through transmission of radio wave signals (e.g., WiFi or Bluetooth), or any suitable means. In other embodiments, the status of the cell may be displayed at the cell itself through the use of a visual indicator such as an LED light.

Additionally, a method of producing the battery cell, as described above, is disclosed. The frame of the battery cell may be molded, for example, using injection molding or formed by a similar method. A mold for the frame is created and filled with the material suitable for production of the frame, as was described above. The terminals may be incorporated into the frame structure as integral parts of the frame by placing the terminals into the mold such that the exterior portion extends beyond the periphery of the mold and at least a portion of the terminals protrudes into the mold. The mold is then filled with the molten material. The terminals are thus over-molded which eliminates sealing issues around the terminals. The seal between the frame material and the terminals is a hermetic seal.

In one or more embodiments, a portion of each terminal, which is intended to remain a bare metal exterior to the cell, the exterior portion, may be isolated from the molten frame material. A second portion of the terminal may be isolated from the molten frame material to form a bare metal portion that is located inside the cell frame and which serves as a connection for the electrode current collectors. Thus, at both ends, portions of the terminals are separated from the mold to provide an area that is unmodified for electrical connections to the cell electrodes and/or the exterior electrical connections. Molding the terminals within the frame structure allows the terminals to be reliably fixed in the rigid frame structure that provides greater mechanical integrity, easier sealing, and enhanced protection against mechanical damage to the cell.

After cooling, the frame with integral terminals and/or other features may be removed from the mold.

The method may include forming the frame in such a way that the nature of the structure includes one or more passages which may serve as the channels described above. For example, the frame may be formed as a honeycomb structure with passages transverse to the faces, the top and bottom portions of the pouch or cell. The honeycomb structure may be configured so that a fluid may flow through the passages within a cell or within a stack of cells. In such an embodiment, aligned frames may form a continuous fluid path through a plurality of frames.

The frame may be formed from a plurality of subcomponents which may be produced as separate pieces and interconnected to form the frame. For example, an upper half of the frame may be formed, the upper half containing the terminals, and later connected to a separately formed lower half which does not contain the terminals. Alternatively, two separately formed portions may each include one terminal. Alternatively still, two halves of the frame, one forming the top of the frame and the second forming the bottom of the frame, may be formed separately. Once formed, the metal terminals may be inserted within terminal slots between the top and bottom halves of the frame and secured. The sub-components may interlock in such a way as to provide a hermetic seal between the adjacent sub-components of the frame, for example, through physical pressure. Alternatively, the sub-components may be connected by an adhesive, screws, bolts, the like, or a combination thereof.

Other features such as one or more openings, ports, vents, channels, electronic devices may be provided in the frame. For example, the mold may be created such that the features are formed when the material fills the mold, the features may be molded-in-place during manufacturing of the frame. Alternatively, the features may be formed and/or attached by welding, adhesion, or the like to the frame after the frame is molded and cooled.

The method may further include connecting the current collectors of the cathode and the anode to the terminals. The connection may be made by any suitable method that creates a low electrical resistance connection, such as by welding, through the use of conductive adhesives, by soldering, or by mechanical means. The current collectors may be attached to the interior portion of the terminals. Following the assembly of the stack of electrodes and separators, the stack may be inserted into the frame and the current collector tabs attached to the terminals. Subsequently, the faces of the frame, the top portion and the bottom portion, may be formed using a cell cover, as described above. The cell cover may be attached using any suitable sealing method such as heat sealing, welding (e.g. thermal or ultrasonic), through contact with a pressure sensitive adhesive applied to the frame or cover, through application of a curing adhesive such as epoxy or reactive vulcanization sealants, or any chemical or physical method of joining the materials that provides a hermetic seal or any combination thereof. The cell cover includes the frame with the anode, cathode, and separator such that at least a portion of the frame forms an internal portion of the cell. In at least one embodiment, the entire frame structure is located within the cell cover.

Once the cell includes the cell cover(s), an opening may be formed to serve as an electrolyte fill port if not already provided during fabrication of the frame. The cell is filled with a liquid electrolyte via the fill port. The port may be hermetically sealed. Alternatively, as was discussed above, the port may serve a different or an additional function such as a dedicated vent for release of access gas pressure from within the cell.

The method may also include assembling a stack of cells formed according to the method described above. A plurality of cells is arranged adjacent to each other, aligned, interlocked, or a combination thereof. In at least one embodiment, the frames may be assembled, aligned, interlocked, or a combination thereof after each frame receives the anode, separator, and cathode but prior to the frame receiving the cell cover. In such an embodiment, the aligned and/or interconnected frames are provided with a stack cover. The stack cover may be an equivalent to the cell cover described above but the cell cover is common to a plurality of the frames and encloses the plurality of the frames within the stack. For example, all of the frames may be included within a common cover.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A lithium ion pouch battery cell comprising:
   a rigid frame forming a skeleton of the cell and defining an aperture being devoid of a rigid structure;
   an anode, a separator, and a cathode disposed within the aperture, the anode and cathode each including a current collector with an exposed tab portion;
   a pair of terminals hermetically sealed into the frame, each having an exterior portion extending beyond the frame periphery and an interior portion bonded to one of the current collectors; and
   a cell cover arranged to envelop the entire frame, the anode, the separator, the cathode and holding electrolyte disposed within the cell, the cell cover being more flexible than the frame.

2. The battery cell of claim 1, wherein the cell cover comprises a flexible flat polymeric sheet.

3. The battery cell of claim 2, wherein the cell cover is arranged around the frame in a tight manner.

4. The battery cell of claim 1, wherein the pair of terminals is molded within the frame.

5. The battery cell of claim 1, wherein the frame comprises a cooling channel running within at least one side of the frame.

6. The battery cell of claim 1, wherein the frame comprises a bifurcated cooling channel.

7. The battery cell of claim 1, further comprising an interlocking feature, an alignment feature, an electronic communication device, or a combination thereof.

8. The battery cell of claim 7, wherein the electronic communication device comprises a temperature sensor, a strain sensor, a threshold value detector, a voltage or current detector, a sensor providing a signal to a conditioning device, or a combination thereof.

9. A lithium ion pouch battery cell comprising:
   a rigid frame including a cooling channel arranged along periphery of the frame, the frame forming a skeleton of the cell and defining an aperture being free from a rigid structure;
   an anode, a separator, and a cathode arranged within the aperture, the anode and cathode each including a current collector; and
   a pair of terminals, integrated into the frame, each having an exterior portion and an interior portion bonded to one of the current collectors; and
   a cell cover arranged around the entire frame, the anode, the separator, the cathode and holding electrolyte disposed within the cell, the cell cover being more flexible than the frame.

10. The battery cell of claim 9, wherein the cooling channel is enclosed within the frame.

11. The battery cell of claim 9, wherein the cooling channel is bifurcated.

12. The battery cell of claim 9, wherein the cooling channel comprises two branches, each branch being routed on a different side of the terminals.

13. The battery cell of claim 9, wherein the cooling channel runs along one side of the terminals.

14. The battery cell of claim 9, wherein the cooling channel runs through three sides of the frame.

15. The battery cell of claim 9, further comprising a dual-purpose sealable aperture, an interlocking feature, an alignment feature, an electronic communication device, or a combination thereof.

16. A lithium ion pouch battery cell comprising:
   a rigid frame forming a skeleton of the cell and defining an aperture;
   an anode, a separator, and a cathode disposed within the aperture; and
   a pair of terminals, integrated into the frame, the frame including an inward electrically non-conductive portion surrounding the aperture and an outward thermally conductive portion surrounding the inward portion such that the terminals are free from contact with the outward portion, and
   a cell cover arranged to envelop the entire frame, the anode, the separator, the cathode and holding electrolyte disposed within the cell, the cell cover being more flexible than the frame.

17. The battery cell of claim 16, wherein the rigid frame comprises a cooling channel running within at least one side of the frame.

18. The battery cell of claim 16, wherein the aperture is devoid of a rigid structure.

19. The battery cell of claim 16, wherein the electrically non-conductive portion is made from plastic.

* * * * *